350-385 SR

SEARCH ROOM

OR 3,520,589

X 4022E X 4026T WP

July 14, 1970 Y. ANGEL ET AL 3,520,589

OPTICAL RELAY FOR TELEVISION PURPOSES

Filed Jan. 24, 1967 4 Sheets-Sheet 1

INVENTORS
YVES ANGEL
GERARD MARIE
RAOUL GENEVE

BY [signature]
AGENT

INVENTORS
YVES ANGEL
GERARD MARIE
RAOUL GENEVE
BY Frank R. Jeffrey
AGENT

July 14, 1970 Y. ANGEL ET AL 3,520,589

OPTICAL RELAY FOR TELEVISION PURPOSES

Filed Jan. 24, 1967 4 Sheets-Sheet 3

INVENTORS
YVES ANGEL
GERARD MARIE
RAOUL GENEVE
BY Frank R. Trifari
AGENT

OPTICAL RELAY FOR TELEVISION PURPOSES

INVENTORS
YVES ANGEL
GERARD MARIE
RAOUL GENEVE
BY Frank R. Trifari
AGENT

United States Patent Office 3,520,589

Patented July 14, 1970

3,520,589

OPTICAL RELAY FOR TELEVISION PURPOSES

Yves Angel, Paris, Gerard Marie, L'Hay-les-Roses, and Raoul Geneve, Boulogne-sur-Seine, France, assignors, by mesne assignments, to U.S. Philips Corporation, New York, N.Y., a corporation of Delaware Filed Jan. 24, 1967, Ser. No. 611,306

Claims priority, application France, Jan. 26, 1966, 47,357

Int. Cl. G02f *1/28*

U.S. Cl. 350—150 5 Claims

ABSTRACT OF THE DISCLOSURE

An optical relay especially for reproduction of televised images which includes a plate of electrically insulating material consisting of an acid salt enriched with deuterium disposed between a polarizer and an analyzer. One major face of the plate is scanned by an electron beam which releases secondary electrons which are collected by an anode. A variable electric field is applied across the plate with a direction parallel to the general direction of propagation of light in the optical path which includes the plate analyzer and polarizer whereby the light is variably transmitted in dependence upon the field. The temperature of the plate is stabilized in the proximity of its Curie temperature so that it is ferroelectric and the light transmitted is greatly dependent upon the electric field.

The invention relates to the conversion of an electric signal which is variable in time and represents the video information, into a visible picture. It is known to use a television receiver for this purpose.

In the display tube of a television receiver the electron beam usually performs the three fundamental functions of this conversion:

(a) the beam supplies the energy to be converted into light (the light output power of the tube is therefore always lower than the power transferred by the beam), (b) the beam scans the surface of the target, (c) the beam transmits the video information.

With respect to the functions (b) and (c) it should be noted that the power of the beam and hence the image brightness cannot be raised to an extent as is required for the project onto a large screen.

It has been proposted to separate said functions and to have the function (a) performed, for example, by an arc lamp and the functions (b) and (c) by a so-called "optical relay." Various types of such a relay have been designed. The relay mostly employed, the eidophor, is heavy, bulky and difficult in starting. A further relay has been proposed by Rissmann and Vosahlo ("Untersuchungen zur Lichtsteuerung und Bildschreibung mit Hife elektro-optischer Einkristalle," Jenaer Jahrbuch 1960, First volume, page 228). In this case a crystal is used, which produces an electro-optical effect, the so-called "Pockels" effect. A crystal of $KH_2PO_4$ has been found to be suitable. This material will hereinafter be termed KDP material.

As far as relevant this effect will be explained below.

When the electrically insulating crystal is exposed to an electric field parallel to its crystal axis *c* (the three crystal axes *a*, *b* and *c* form a trieder of three rectangles; in this case the axis *c* is the optical axis), the refraction index of this crystal for light rays in the *c*-direction with linear polarization in the *ab*-plane depends upon the direction of polarization. If X and Y designate the bisectors of the axes *a* and *b* and if the parameters of the crystal with respect to these different directions are designated by the letters used for said directions, it can be said that the diagram of the refractive indices in the *ab*-plane forms an ellipse having axes X and Y, instead of forming a circle and that the difference $n_x - n_y$ is proportional to the electric field applied. It follows therefrom that, if the incident light rays are polarized parallel to the axis *a*, the intensity of the light I passing through an output polarizer is: $I = I_0 \sin^2 kV$, if the direction of polarization of this polarizer is parallel to the axis *b* and $I = I_0 \cos^2 kV$, if said direction is parallel to the axis *a*, wherein $I_0$=the intensity of the incident light if no parasitic absorption occurs and, wherein V is the electric potential difference between the two planes of the crystal and *k* is a coefficient dependending upon the crystal material used.

For the proposed optical relay a thin, monocrystalline plate of KDP is employed, the thickness of which is parallel to the axis *c*, said plate being arranged between two polarizers. In order to obtain a projected picture by means of a lamp by means of said device, it is sufficient, as stated above, to apply an electric field parallel to the axis *c* and to cause the value of the field at any point of the plate to correspond to the brightness at the corresponding point of the picture to be obtained. For this purpose an electron beam from an electron gun is caused to scan the plate by means of conventional deflection members, so that the beam performs the function (b). The function (c), here the control of the electric field, is also performed by the beam in the following manner: The electrons of the beam striking the surface of the plate produce secondary electrons, however, with a secondary-emission coefficient lower than 1. Thus, negative charges are produced at the points of the insulating plate struck by the beam, said charges varying the electric field at right angles to the plate at the points concerned. The relevant charges depend upon the acceleration voltage of the electron beam and particularly upon the anode voltage and the quantity of electric power supplied by the beam, which quantity is the product of the beam intensity and the duration of the passage of the beam across the relevant point of the plate. The term "point" has herein the meaning of an elementary surface portion. The video signal may be used previously for the modulation of one of these four magnitudes. In the relay described either the anode voltage or the beam intensity may be modulated, but only the latter possibility is found to be practicable. Also this possibility implies various drawbacks; for example, the negative charge produced on the plate is not a linear function of the beam intensity; a further, more important disadvantage resides in that it is required for the variation of the image that this charge should be dissipated at least partly between two consecutive images. This dissipation involves flickering of the image observed by the spectator; the effect thereof is usually reduced only by a further complication of the scanning system (interlacing). Said dissipation furthermore results in that the transparency is always small. When a KDP-crystal is employed, it is necessary, in order to dissipate the charges, within less than 1/10 sec., to operate at the ambient temperature, which involves important variations of the potential of the screen of a few $kV$, so that focusing of the electron beam is seriously hindered. It is therefore desirable to use the modulation of an electrode voltage, for example the anode voltage. The amplitude required for a satisfactory operation of this modulation, that is to say, a number of kilovolts with the material hitherto known for obtaining the Pockels effect, is found in experiments not to be obtainable.

The present invention has for its object to provide an optical relay for television purposes, which is free of the aforesaid disadvantages. This relay comprises a plate of electrically insulating material, which is transparent to light in accordance with the electric field parallel to the direction of propogation of the light, means for scanning a first face of said plate by an electron beam and an anode for collecting the secondary electrons released by the beam. The invention is characterized in that the plate consists of a material which becomes ferroelectric below a given temperature and is employed in the proximity of this temperature, said material consisting of an acid salt, the Curie-temperature of which is normally lower than the ambient temperature, the hydrogen of this salt being enriched with deuterium, so that the ambient temperature is approached, while the assembly comprises a device for controlling the temperature of the plate and a device for measuring this temperature, the latter device being formed by a member for measuring the capacitance of a capacitor, the dielectric of which is formed by a plate cut from the same material as the aforesaid plate.

The invention will now be described by way of example with reference to only those parts that are required for a good understanding of the invention are shown in the figures; corresponding parts are designated by the same references.

In the following embodiments the plate whose light transmission properties depend upon the electric field applied thereacross is formed by a single crystal of double acid potassium phosphate (KDP), as referred to above, in which about 95% of hydrogen is formed by deuterium. Other, electrically insulating crystals pass the light in dependence upon the electric field parallel to the direction of propagation of the light and exhibit the aforesaid Pockels effect, so that these crystals may also be employed within the scope of the invention. However, crystals, for example, of copper chloride and zinc sulphide, require a very high amplitude of the electric signal for the modulation of the light, for example, from 0 to 75% of the incident light; this amplitude amounts to a few kilovolts, which is a drawback. With a given thickness of the crystal the Pockels effect is proportional to the charges produced on the crystal faces and hence, with a given control-voltage, to the electric constant of the crystal.

According to a further feature of the invention it is advantageous to use a temperature of a value approaching the Curie temperature with a plate of a crystal which becomes ferro-electric beneath said Curie temperature. The dielectric constant then attains very high values, while the invention can be carried out by means of readily obtainable control-voltages (the Pockels effect is proportional to the product $\epsilon V$).

The most frequently used crystals exhibiting this phenomenon are acid salts of the KDP-type in the class of the quadratic crystals, the optical axis of which is parallel to the crystal axis $c$. Examples thereof are the compounds obtained by replacing in the formula $KH_2PO_4$ the K-ion by Rb or Cs, the $PO_4$-ion by $AsO_4$ and the hydrogen-ion H by deuterium D. By the last-mentioned replacement the crystal temperature can be made to closely approach its Curie temperature. Among these compounds $KD_2PO_4$, containing about 5% H-ions on the basis of the deuterium ions, and being easily obtainable, exhibits a suitable temperature of about −55° C. The dielectric constants $\epsilon a$, $\epsilon b$, $\epsilon c$ occur in the directions of the crystal axes $a$, $b$ and $c$; the ferro-electric phenomenon is found only in the direction of the axis $c$ ($c$ may be $5.10^5$ with a free crystal and 700 with a fixed (for example, adhering) crystal, whereas $a$ and $b$ do not exceed a value 100).

Figure 1:
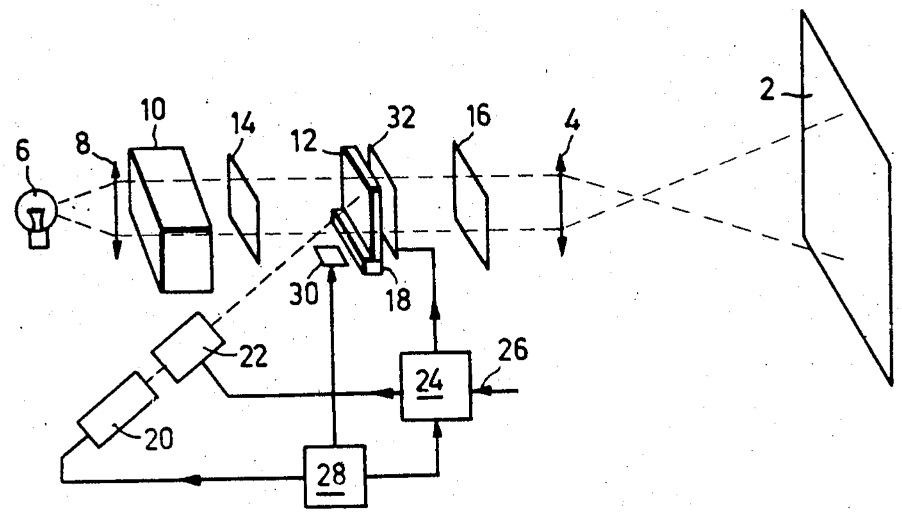
FIG. 1 shows diagrammatically, partly in a perspective view and partly in a block diagram, members of a first embodiment, in which the plate is traversed by the light only once.

FIG. 1 shows diagrammatically the essential members of an optical relay according to the invention and the members co-operating herewith for reproducing a visible picture on a screen 2 through a projection lens 4. The light is supplied by a lamp 6, herein an incandescent lamp; of course, any other type of lamp may be employed. The light passes through a collimator lens 8, then a space 10 serving for suppressing the infrared rays. The optical relay is formed essentially by a plate 12 consisting of a parallelopiped-shaped single crystal of KDP, the optical axis $c$ of which is at right angles to the major faces; this crystal is arranged between two cross polarizers 14 and 16, the polarization planes of which are parallel to the two further crystal axes ($a$ and $b$) of the single crystal. A thermal control-device 18 is connected with the plate 12, which is thus held approximately at the value of the Curie temperature, that is to say between −50° C. and −55° C. An electron beam is directed to the left-hand face of the plate; this beam is indicated by a broken line and emanates from an electron gun 20. This beam scans periodically the whole useful surface of the plate 12 by means of deflection means 22, which are controlled by scanning signals of a receiver 24, which receives at the input 26 the synchronizing signals and the video signal proper. A block 28 supplies, for some of said elements, the required direct voltages, as well as for an anode 30. For the sake of clarity the anode is represented by a plate parallel to the light beam. This arrangement is, of course, very conducive to the passage of light, but not to the collection of secondary electrons emanating from all points of the plate 12 struck by the electron beam. In practice, the anode is therefore arranged parallel to the face of the plate 12 in close vicinity thereof. Since the incident electron beam and the light beam have to pass the anode, the latter is constructed, for example, in the form of a grid.

FIG. 1 shows furthermore a thin plate 32, which is electrically conductive and optically transparent and which is formed in practice by a thin metal layer (gold, silver, chromium) and which is covered, for improving the adhesion, by one or more metal oxide layers (SiO, $SiO_2$, $Bi_2O_3$, $Ag_2O$). The video information signal is applied between this thin metal layer and the anode. The potential of the layer can be fixed at a given value and the information signal can be applied to the anode, but in the embodiment described herein the conductive, transparent layer receives the signal, so that this layer forms a control-electrode.

The mechanism of this control is as follows.

When the electrons of the electron beam arrive at the face of the plate, they release secondary electrons, if the energy lies within the desired limits and if the anode potential is sufficiently high, the number of secondary electrons exceeding that of the incident electrons. As a result the potential of the point of incidence is raised so that the potential difference between the anode and said point is reduced. If the electrons of the beam strike this point to an adequate extent, said potential difference becomes negative and reaches such a value (for example, −3 v.) that each incident electron releases only a single secondary electron. The potential of the point thus reaches a limit value with respect to the anode potential. In accordance with the scanning rate the intensity of the beam has to be chosen sufficiently high. If the potential of the point concerned is initially not lower but higher than said limit value, the secondary emission does not compensate the charges produced by the beam, so that said potential gradually drops to said value.

Now the control-electrode will be described. If the anode potential is constant, each passage of the electron beam fixes, as stated above, the potential of any point A of the face at a value $V_o$ independently of the point of incidence and of the instant of passage. The corresponding electric charge at the point concerned depends upon the potential of the control-electrode, arranged in the proximity of the other face of the plate. Merely the "capacitor," whose dielectric is formed by said plate and whose electrodes are formed by the control-electrode and the element of the surface struck around the point A, will show that, if $V_A$ is the potential of said electrode at the instant of passage, the charge is proportional to $V_O - V_A$. Since the charge is produced on an electrically insulating surface, it remains constant until the next passage of the beam across the same point A, as well as the potential difference $V_O - V_A$ between the two faces of the plate at the point concerned and the electric field concerned, which is at right angles to the plate and the control-electrode. The electric field, controlling the passage of the light through the plate at the point A, is itself constant between two passages of the beam and is governed during these passages by the video information signals. This also applies to a further point B, where the fixed potential difference at the passage of the beam is $V_O - V_B$, wherein $V_B$ is the value of the video information signal at the instant of passage.

The constancy of the electric field between two consecutive passages of the beam prevents flickering of the image, so that, if the image to be reproduced is developed only very slowly, only a few images have to be transmitted per minute.

The device described above operates as follows: the electron beam scans the plate 12; the resultant charge at any point depends upon the signal applied to the thin plate 32; the electric voltage V fixed between the two faces of the plate at a given point varies the optical indices of the point so that the light intensity of the polarizer 16 is proportional to $\sin^2 kV$, as well as the brightness of the relevant point on the screen 2, which reproduces the desired image.

For the sake of clarity the plate 12 is shown in the figure at right angles to the light beam; only the electron beam is incident at an acute angle. In practice it may be preferred, owing to the presence of the grid in front of the screen, operating as the anode 30, to minimally incline the axes of the beam which leads to inclining both of the beams at a small angle. With such small angles the electric field, which is at right angles to the plate, may still be considered to be substantially parallel to the general direction of the light beam. However, it is found that owing to the double refraction the KDP crystal produces a phase shift, when it is traversed by a light beam, which is at a given angle to the optical axis *c*.

This phase shift is compensated by arranging, between the two polarizers 14 and 16, a crystal plate (not shown), the optical axis of which is parallel to that of the plate 12 and which has double refraction of opposite sign. A simple calculation shows that the difference in the course of two light components in orthogonal directions is approximately equal to:

$$L\frac{n_e - n_0}{n_0^2}i^2$$

wherein L is the thickness of the traversed crystal, $n_o$ and $n_e$ are the normal and the extraordinary refractive indices and *i* is the angle between the light beam and the optical axis on the outer side of the crystal. The crystal $KD_2PO_4$ has a negative double refraction:

$$n_e - n_0 = 1.4684 - 1.5100 = -0.0416$$

In order to compensate this double refraction a crystal of positive double refraction, for example of quartz is chosen, which exhibits the relationship:

$$n_1 - n'_0 = 1.5533 - 1.5442 = 0.0091$$

the accent means that the relevant magnitude applies to the compensating crystal. In order to reduce the phase shifts introduced by the two crystals to zero, it is sufficient to realize the relationship:

$$L\frac{n_e - n_0}{n_0^2} + L'\frac{n_e - n'_0}{n'^2_0} = 0$$

In the case of quartz a plate of a thickness L′ is chosen, which is 4.8-times greater than the thickness L of the plate of $KD_2PO_4$. Quartz having a positive double refraction can be easily obtained with the required optical properties, but it has the disadvantage that it exhibits an important rotatory factor of the order of 27°/mm. In order to compensate for this, the plate of quartz is divided into two portions, each formed by one plate, one plate being formed from a dextro-rotatory crystal and the other plate being cut from a levo-rotatory crystal.

Figure 3:
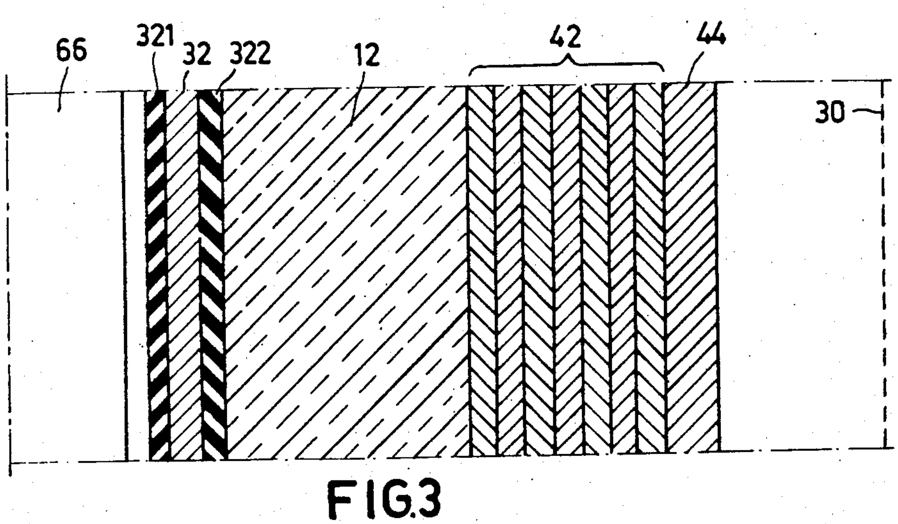
FIG. 3 is a diagrammatic, sectional view of the device of FIG. 2 on an enlarged scale.
Figure 2:
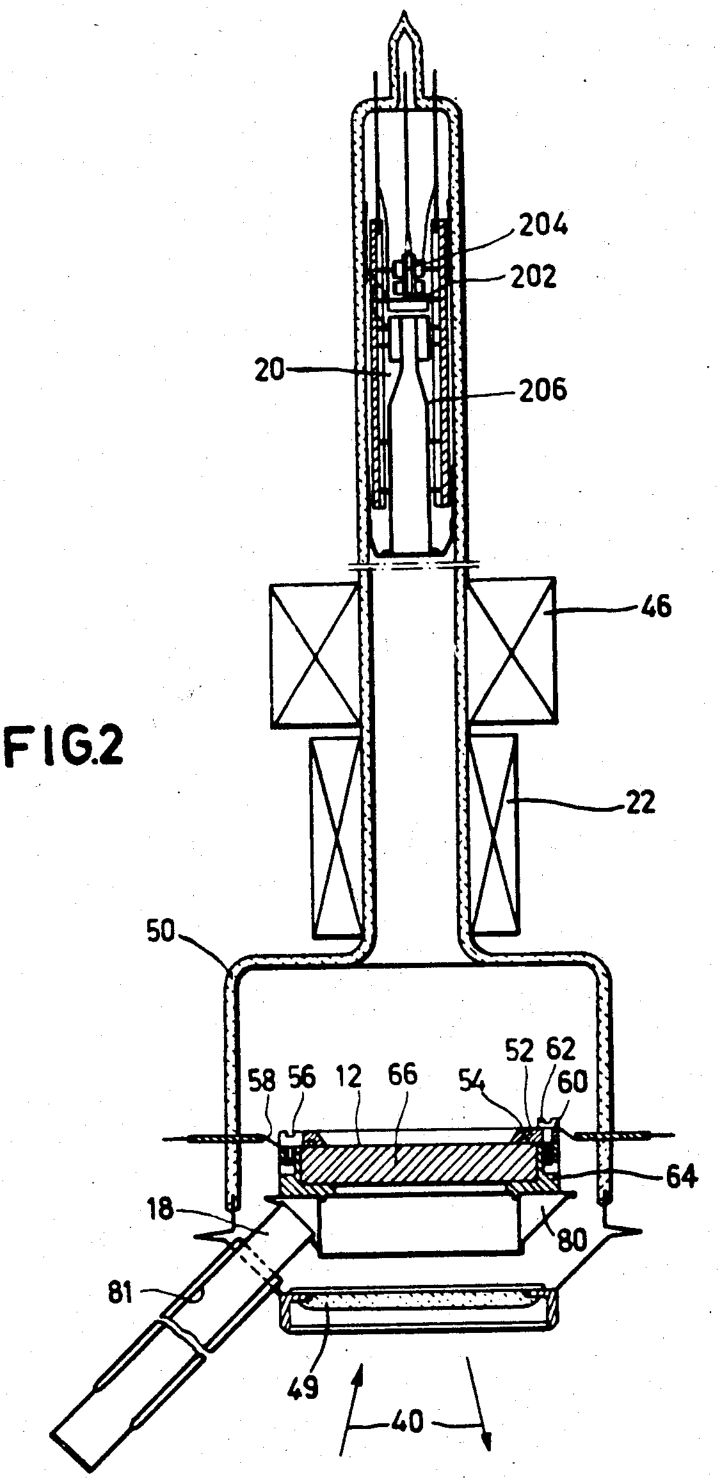
FIG. 2 is a sectional view of the vacuum tube forming the essential part of the optical relay according to the invention in a second embodiment in which the light is reflected from one of the faces of said plate.

In the device according to the invention, shown in FIGS. 2 and 3, the light beam indicated by the arrows 40, striking the plate 12 at an angle of 5°, is reflected on the rear face of the plate by a mirror 42 (FIG. 3), which is electrically non-conducting. This mirror may be formed by a metal layer deposited in the vapor phase, in vacuo, across the grid 30; in this embodiment the mirror comprises a multiple dielectric and is formed by seven layers alternately of zinc sulphide and cryolite; the thickness of each layer is equal to ¼ wavelength of the light. In order to raise the secondary-emission coefficient a cryolite layer 44 of double the thickness is added. The rear face of the plate 12 captures the electron beam emanating from the gun 20. This beam is accelerated by a voltage of 2000 v. between the cathode 202, having a filament body 204, and the electrode 206, which is electrically connected to the anode 30. The beam is then magnetically deflected by the four coils 22 after having been focused by means of the coil 46, so that with an intensity of 26 μa. the current intensity at the level of the layer 44 is 1 a./cm.². In this way 600×800 discrete points on a surface of the plate 12 of 27 x 36 mms. are scanned.

The layer 44, the mirror 42 and the various other layers are applied in order of succession.

Due to the mirror 42 the light has to traverse the plate 12 twice, so that with a given thickness of the plate and a given electric voltage the resultant phase shift is doubled. The analysis by the electron beam is facilitated, when it is incident at right angles. Moreover, the light does not traverse the anode 30, so that the transparency is improved. The cross-wise polarizers (not shown) are arranged in front of the tube, that is to say on the left-hand side in the figure, in the paths of the incident beam and of the reflected beam at a distance sufficient for separating these beams completely from each other. The polarizers are of the known, commercially available "polaroid" type.

Figure 4:
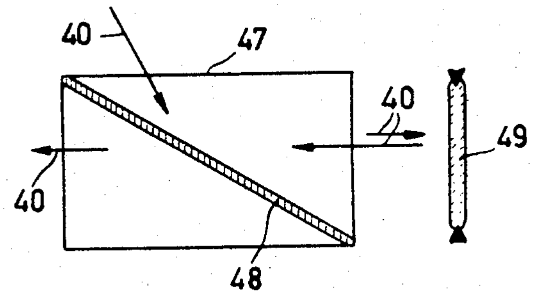
FIG. 4 is a sectional view of a polarization device to be disposed in front of the tube of FIG. 2.

In a variant of the invention a polarization device employing a prism is used in front of the tube of FIG. 2, which prism is shown in FIG. 4 and replaces the two cross polarizers. This prism has the shape of a rectangular parallelopiped 47, having a height of 3 cms., a depth of 4 cms. corresponding to the height and the width of the picture, and a length of 5.2 cms. The prism is divided into two portions along a diagonal plane by a plate 48 of 6 x 4 cms. of small thickness (1 mm.), cut from a double-refraction crystal (in this case a spar crystal), so that the optical axis is at right angles to the plane of the drawing. The remaining part of the volume is filled out by a liquid or a solid having an optical index lying between 1.7 and 1.8. The light indicated by the arrows 40 is incident from above as shown in the figure. Merely the component whose electric oscillation is at right angles to the plane of the drawing is reflected towards the tube by the spar plate 48, since its index $n_e=1.486$. After reflection inside the tube, the light returns and the component whose electric oscillation is normal to the plane of the drawing is reflected towards the source and gets lost. The component whose electric oscillation is vertical in the plane of the drawing, however, strikes the spar plate of the refractive index $n_0=1.658$ and is substantially not reflected. This component is used for the projection of the image. This device has a better optical efficiency than the two "polaroid" polarizers and permits the use of a light beam at right angles to the window 49 and to the sensitive plate 12.

In a further variant of the invention it is also possible to use only one polarizer of the conventional type in the proximity of the inlet window 49 of the vacuum tube 50, so that the incident and reflected beams traverse it completely. In this case the intensity of the light striking the screen is not proportional to $\sin^2 kV$, but to $\cos^2 kV$, as stated above with reference to the Pockels effect. It follows therefrom that the direction of the variations of the video information signal has to be opposite the direction corresponding to the use of the two crosswise polarizers. The operation of the optical relay remains, however, like described and the members of the tube 50 are independent of the number and types of the polarizers used.

FIG. 3 shows on the right-hand side the anode 30, formed by a grid and acting as a collecting member for the secondary electrons from the layer 44 released by the incident electrons of the beam emitted by the gun 20. The collecting grid is made of copper; the pitch is 50$\mu$ and the thickness is about 10$\mu$. The diameter of the openings is about 45$\mu$, so that the transparency for the incident electrons lies between 60 and 70%. This grid is stretched on an annular support 52 (FIG. 2) of a copper-nickel alloy, having an expansion coefficient approximately equal to that of copper. This support has a useful, circular passage of 40 mms. and has a narrowed portion 54, in which a copper-nickel ring can be accommodated. In order to fix the grid to the support, the ring carrying the grid is pressed into the narrowed portion 54, while the grid is taken along, after which the ring and the support are secured to each other by spot welding. After mounting the grid is thermally annealed in order to obtain an appropriate mechanical stress of the grid.

The support 52 of the grid 30 has a gap 56 for passing the connecting wire 58 of the control-electrode 32 and six apertures 60. The support is secured by screws 62 to a trough 64; these two parts are brought to earth potential. The depth of the trough is equal to the thickness of a disc 66, the function of which will be described hereinafter. In order to maintain the chosen space of 50$\mu$ between the grid 30 and the layer 44, mica spacers (not shown) are arranged between the support 52 and the trough 64. In front of the plate 12 there is located the control-electrode 32, which has to be sufficiently thick for obtaining a low resistance per square, which is in this case lower than 500 ohms (the resistance per square is measured between two parallel sides of a square of the layer). However, the electrode has to be thin in order to provide satisfactory transparency. In the embodiment described the electrode is formed by a metal layer (gold, silver, chromium), covered by one or more metal oxide layers 321 and 322 for improving the adhesion (SiO, $SiO_2$, $Bi_2O_3$, $Ag_2O$, for example).

Figure 5:
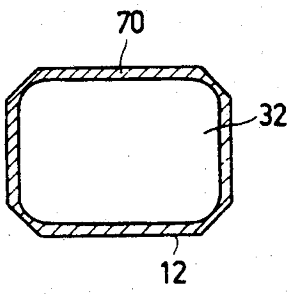
FIGS. 5 and 6 show two elements of the tube of FIG. 2 in a front view.
Figure 6:
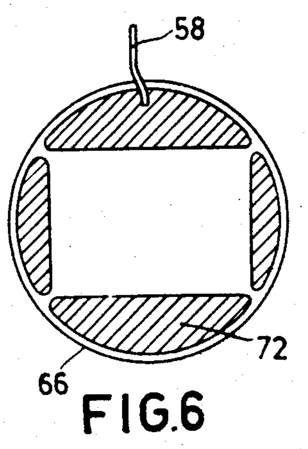

The sensitive plate 12 has approximately the shape of a rectangle of 3 x 4 cms. (FIG. 5). At the edges of this rectangle the rear face is provided with an aluminum layer 70, which has a useful opening of 27 mms. x 36 mms. and which allows a satisfactory, electrically conductive connection with the control- electrode 32. When the plate 12 is arranged on the disc 66, this layer 70 is in contact with an aluminum layer 72 (see FIG. 6), which is provided in four sectors on the front face of the disc 66. These four separate sectors permit, subsequent to mounting, of checking the electric contact between the layers 70 and 72. The layer 72 is provided with the connecting wire 58, through which the video information signal is applied to the electrode 32. The thickness of the plate 12 is 0.2 mms., which is compatible with said picture definition (600 x 800 points). In the proximity of the Curie temperature the dielectric constant is, as stated above, much higher in the direction of the optical axis of the crystal than in any other direction. As a result the lines of force of the electric field cannot depart from the normal to the plate, while through its thickness the definition obtained by the distribution of the charges on the layer 44 can be maintained.

Figure 7:
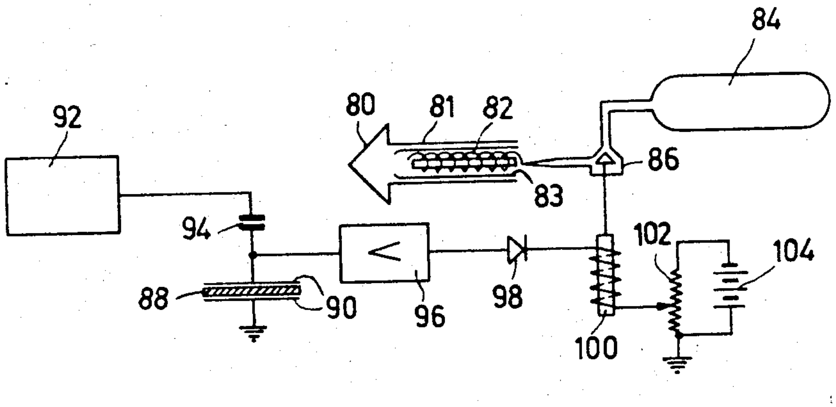
FIG. 7 is a block diagram of the thermal control-devices suitable for use with the tube of FIG. 2.

In order to maintain the temperature at the suitable value, the heat developed in the vicinity of the plate 12 has to be conducted away; this heat is produced by the electron bombardment and the aparasitic absorption of luminous energy. The plate is attached to a fluoride plate 66 having a thickness of 8 mms. and a diameter of 5 cms., the expansion coefficient approaching that of KDP. This disc is arranged in the copper trough 64, which is cooled by the hollow ring 80, which communicates with a Joule-Thompson cryostate 18, to which nitrogen is supplied under a pressure of 150 kgs./cm.$^2$. Only the place 81 of this cryostat is shown. Such a cryostat can be formed by a narrow tube 82 (see FIG. 7), which terminates in a small aperture and is wound inside an inner tube 83 having a thermally insulating wall. The gas expands through said aperture so that it is cooled and in turn, during its escape, along the narrow tube, the gas cools the incoming gas. The temperature thus drops gradually.

A further suitable cooling device may be used, for example one having the Peltier effect. In this embodiment the supply of nitrogen from a container 84 is controlled by an electrode-vessel 86, which is controlled, in turn, by a temperature adjusting instrument of a conventional type. According to a further feature of the invention this adjusting instrument is constructed as follows. A plate 88 of a diameter of 5 to 10 mms. and a thickness of about 0.5 mms. is cut from the same crystal as is used for the plate 12. The plate 88 is covered with two electrodes and attached to the free surface of the grid support 52. The plate (not shown in FIG. 2) thus follows accurately the temperature fluctuations of the assembly with the plate 12 and the measurement of the capacitance permits adjustment of the operating temperature. This method of adjustment has the advantage that the measured capacitance is proportional to the dielectric constant of the crystal and hence to the electro-optical sensitivity which has to be stabilized.

In the device shown in FIG. 1 the thickness of the plate 12 is 0.2 mms., which corresponds to a high value of the image definition, since in the proximity of the Curie temperature the dielectric constant is, as stated above, considerably higher in the direction of the optical axis of the crystal than in any other direction. Therefore, the lines of force of the electric field cannot deviate from the normal to the plate, so that throughout the thickness of the plate the resultant definition can be maintained in accordance with the distribution of charges.

The other elements of the control-arrangement are: an electrical oscillator 92 of 2 mc./s., a capacitor 94 forming a capacitative bridge with the capacitor 90, an amplifier 96, a detector 98, the electro-magnetic part 100 of the vessel 86 and finally a controllable threshold formed by a potentiometer 102 and a direct-voltage generator 104.

Figure 8:
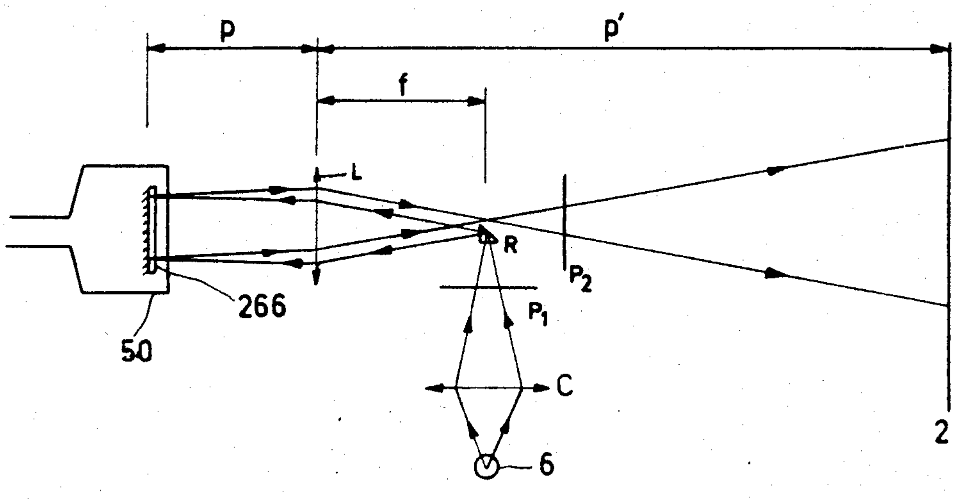
FIG. 8 shows an optional arrangement of crossed polarizers.
Figure 9:
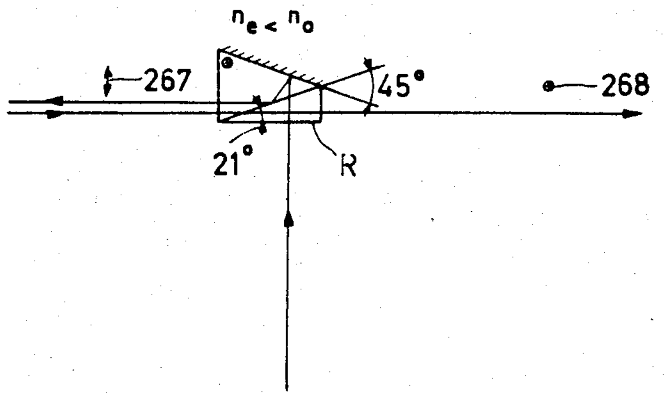
FIG. 9 shows in more detail a prism which may be used in the arrangement of FIG. 8.

The device according to the invention may be improved by applying the measures illustrated in FIGS. 8 and 9.

FIG. 8 shows an optical device for obtaining a light beam which is approximately at right angles to the screen 266 of the tube 50 (see also FIG. 2; the screen 266 of the tube 50 in FIG. 8 is identical with the members 12, 52, 62 of FIG. 2). The source is formed by an arc lamp 6 and a condenser *c* projects the image of the arc onto a small mirror (herein a total-reflection prism R), which is arranged at the focus of an optical system L, having a focal distance *f* (for example a doublet for reducing the aberration of the chromatism). Due to the small dimensions of the image of the source 6, the rays from the optical system L incident to the tube 50 are substantially parallel to each other. The normal to the screen 266 is slightly oblique to the axis of the beam (about 1°), so that the reflected beam is focused to a plane close to the mirror R before the beam strikes the screen 2. The forward and backward directions of the rays may be modified by using the mirror R for the projection onto the screen 2. The optical system L may operate as a projection objectives, the adjustment is then carried out by varying the distance *p* between L and the screen 266; then $1/p'+1/p=1/f$, wherein $p'$ is the distance between the objective and the screen 2. As an alternative, an additional projection objective may be used between L and the screen 2.

FIG. 8 shows the positions of the cross-wise arranged polarizers, $P_1$ and $P_2$ of the polaroid type, arranged in the forward path and the backward path respectively.

This device may be improved by using a polarizing device splitting the beam. This polarizer may comprise a plurality of dielectric layers or it may be derived from the "Glazebrook" prism of spar as is shown in FIG. 9. This polarizer or prism replaces the mirror R of FIG. 8 and in this case the polarizers $P_1$ and $P_2$ may be omitted. The advantage is that overlapping forward and backward beams may be used so that the angle between the light beam and the disc of the tube 50 approaches the value of 90° even more closely. The electric field for the light beam has a direction 267 on the left-hand side of the prism R in FIG. 9 and 268 on the right-hand side of the prism R.

In order to prevent the secondary electrons from the point of the screen 266 struck by the beam from attaining points which may have higher potentials than the point of the gride 30, this grid has to be arranged very near the screen. This may be readily achieved by adhering the grid 30 to the screen after the grid surface is covered with an insulating layer in order to avoid short-circuits between the points of the screen 266 and the grid. This layer may consist of silicon monoxide (SiO) and the thickness may be a few microns.

Since it is difficult to adhere two flat surfaces to each other, one of which (the grid 30) is very thin and elastic, the surface of the screen 266 is shaped in a convex form. The crystal 12 may be spherical with a radius lying between 2 and 4 meters. With a length of the diagonal of 40 mms. the arrow directed to the centre is 50 to 100$\mu$, which is sufficient to stretch the grid and to establish an overall contact with the crystal. When the crystal 12 is satisfactorily fastened and the grid is fixed in place, there are no domains having a temperature beneath the Curie temperature. In operation the temperature may lie between $T_c-4°$ C. and $T_c+2°$ C.

The devices described above have the disadvantage that the capacitance between the grid 30 and the screen 266 is raised Due to the high dielectric constant of the crystal 12 this capacitance does not disturb the operation of the tube 50, but in practice it affects the signal communication. This capacitance may attain 300 to 500 pf., so that a triggered generator having an impedance of about 75 to 100 ohms and hence a high power is required. This may be improved by increasing the thickness of the insulation. Since it is difficult to obtain a great thickness by vapor deposition, it is important to use an insulating grid 30, which may consist of "photoform" glass (Corning), having a thickness of 500 to 100$\mu$, which is coated on the side of the electron beam with a conductive metal layer, for example, by vapor deposition.

In order to prevent secondary electrons from striking the screen 266, an electric field at right angles to the surface of the screen is employed, so that the electrons cannot deviate excessively from the normal to the target point. In order that the electric field should not disturb the scan, it is necessary to envelope the whole scanning space in the same magnetic field; for this purpose an electron-optical system of the vidicon-, plumbicon- or orthicon-type is used. Since the dimensions of the screen 266 of the tube 50 are approximately equal to those of an orthicon, the deflection and concentration coils commonly used therewith may be employed without the need for further means. The secondary electrons tend to travel around the lines of force of the concentration field. Part of these electrons are directly captured by the grid 30 (see FIG. 3), a further part traverses the grid and is finally collected by the last acceleration anode, formed by a cylinder, whose diameter has to be at least equal to the diagonal of the picture (FIG. 3).

Since the intrinsic time constant of the crystal 12 is high the tube 50 may be employed as a storage tube. It then has two important advantages over the known, storage tubes. In the first place erasing and writing are performed simultaneously, so that dead time intervals are avoided. In the second place the reading is quite independent of these two operations; reading may be performed simultaneously herewith without modifying the store. Reading may be performed either by means of a vidicon or by means of any other camera tube connected with such a light source or by means of a photomultiplier with a "flying spot." With a crystal 12 of $KD_2PO_4$ (90% of deuterium) without conductive impurities, operating at $-60°$ C., a storing time of more than three hours has been found. In order to obtain a longer period a compound having a smaller quantity of deuterium may be used, while the operational temperature is lower. With a compound having 50% of deuterium, operating at about $-100°$ C., the storing time has to be theoretically several months.

What is claimed is:

1. An optical relay device comprising a plate of electrically insulating material positioned in an optical plate between a polarizer and an analyzer, said material consisting of an acid salt which is ferroelectric below the Curie temperature thereof, said material being enriched with deuterium whereby the Curie temperature thereof is higher than in the absence of deuterium, means to apply a variable electric field across the plate with a direction parallel to the general direction of propagation of light in said path whereby the light is variably transmitted in dependence upon said field, means to generate an electron beam, means to scan a major face of said plate with said electron beam, an anode for collecting secondary electrons released from said plate by said electron beam, and means to control and stabilize the temperature of said plate at a value which is in the proximity of said Curie temperature.

2. An optical relay device as claimed in claim 1 wherein said temperature controlling means include for sensing the temperature a capacitor having as its dielectric a plate of the same material as the first mentioned plate.

3. An optical relay device as claimed in claim 1 wherein the plate consists of a material exhibiting double refraction and said device further comprises for compensating the phase shift produced by said double refraction a crystalline plate having an optical axis parallel to that of the first-mentioned plate in the path of the light, said crystalline plate exhibiting a double refraction opposite to that of the first-mentioned plate.

4. An optical relay as claimed in claim 3, wherein the first major face of the first-mentioned plate is provided with a mirror of electrically non-conducting material.

5. An optical relay as claimed in claim 1, wherein a plate-like control electrode adjoins the second major face of the first-mentioned plate and a transparent plate of greater thickness than the first-mentioned plate is bonded to the other face of said control electrode.

References Cited

UNITED STATES PATENTS 2,983,824 5/1961 Weeks et al. -------- 350—160 X

RONALD L. WILBERT, Primary Examiner

P. K. GODWIN, Jr., Assistant Examiner

U.S. Cl. X.R.

350—160; 178—7.6